(12) United States Patent
Geurts et al.

(10) Patent No.: US 11,948,217 B2
(45) Date of Patent: Apr. 2, 2024

(54) SYSTEMS AND METHODS FOR PROVIDING NAVIGATION OF MULTIPLE ORGANIZATIONS IN ONE OR MORE ELECTRONIC LEARNING SYSTEMS

(71) Applicant: D2L Corporation, Kitchener (CA)

(72) Inventors: Jeffrey Geurts, Kitchener (CA); Sandra Earl, Kitchener (CA); Chester Twomey, Kitchener (CA); Alexander Lamarre, Kitchener (CA); Anton Bazhal, Kitchener (CA)

(73) Assignee: D2L Corporation, Kitchener (CA)

( * ) Notice: Subject to any disclaimer, the term of this patent is extended or adjusted under 35 U.S.C. 154(b) by 99 days.

(21) Appl. No.: 17/483,011

(22) Filed: Sep. 23, 2021

(65) Prior Publication Data

US 2022/0092712 A1    Mar. 24, 2022

Related U.S. Application Data

(60) Provisional application No. 63/082,503, filed on Sep. 24, 2020.

(51) Int. Cl.
*G06Q 50/20* (2012.01)
*G06F 3/14* (2006.01)
*G08B 5/22* (2006.01)
*H04L 9/40* (2022.01)

(52) U.S. Cl.
CPC ............ *G06Q 50/205* (2013.01); *G06F 3/14* (2013.01); *G08B 5/22* (2013.01); *H04L 63/0815* (2013.01)

(58) Field of Classification Search
CPC ..................................................... G06Q 50/20
See application file for complete search history.

(56) References Cited

U.S. PATENT DOCUMENTS

| | | | | |
|---|---|---|---|---|
| 9,256,761 | B1* | 2/2016 | Sahu | G06F 21/6218 |
| 2001/0044728 | A1* | 11/2001 | Freeman | G06Q 50/205 |
| | | | | 434/335 |
| 2007/0156718 | A1* | 7/2007 | Hossfeld | G06Q 90/00 |
| 2009/0182716 | A1* | 7/2009 | Everhart | G06Q 10/10 |
| | | | | 715/810 |
| 2010/0293041 | A1* | 11/2010 | Teasdale | G06Q 50/20 |
| | | | | 705/14.1 |
| 2013/0073957 | A1* | 3/2013 | DiGiantomasso | G06Q 50/20 |
| | | | | 715/705 |
| 2013/0330704 | A1* | 12/2013 | Creamer | G09B 7/00 |
| | | | | 434/362 |
| 2013/0346333 | A1* | 12/2013 | Hassler | H04W 4/90 |
| | | | | 705/325 |

(Continued)

*Primary Examiner* — Peter R Egloff
(74) *Attorney, Agent, or Firm* — BERESKIN & PARR LLP/S.E.N.C.R.L., s.r.l.

(57) ABSTRACT

A method and system for providing navigation of multiple organizations of one or more electronic learning systems. The method involves operating a processor to obtain a global user identifier, obtain a navigation object to be displayed at the user computing device, and automatically generate an organization alert indicator for an organization object when the user has an outstanding alert from the electronic learning system of the organization. The navigation object includes a plurality of organization objects. Each of the organization objects correspond to an organization identifier of the plurality of organization identifiers for navigating to an electronic learning system of the organization.

18 Claims, 8 Drawing Sheets

(56) References Cited

U.S. PATENT DOCUMENTS

2015/0213460 A1* 7/2015 Anderson .............. G06Q 50/20
  705/318
2017/0187717 A1* 6/2017 Michalowitz ........ G06Q 10/107
2021/0397987 A1* 12/2021 Dixit ....................... G06F 9/451

* cited by examiner

SYSTEMS AND METHODS FOR PROVIDING NAVIGATION OF MULTIPLE ORGANIZATIONS IN ONE OR MORE ELECTRONIC LEARNING SYSTEMS

CROSS-REFERENCE TO RELATED PATENT APPLICATIONS

This application claims priority from U.S. Provisional Patent Application No. 63/082,503, filed on Sep. 24, 2020. The entire contents of U.S. Provisional Patent Application No. 63/082,503 is herein incorporated by reference for all purposes.

FIELD

The described embodiments relate to methods and systems associated with electronic learning systems, and in particular, to providing navigation of one or more electronic learning systems.

BACKGROUND

Electronic learning (also known as "e-Learning" or "eLearning") generally refers to education or learning where users engage in education related activities using computers and other computing devices. For example, users may enroll or participate in a course or program of study offered by an educational institution (e.g., a college, university or grade school) through a web interface that is accessible over the Internet. Users may receive assignments electronically, participate in group work and projects by collaborating over the Internet, and be graded based on assignments and examinations that are submitted, for example, using an electronic submission tool.

Electronic learning is not limited to use by educational institutions. Electronic learning may be used in other environments, such as government and corporations. For example, employees at a regional branch office of a corporation may use electronic learning to participate in a training course offered by another office, or even a third-party provider. As a result, the employees at the regional branch office can participate in the training course without having to travel to the site providing the training course. Travel time and costs can be reduced and conserved.

Furthermore, because course materials can be delivered electronically, there are often fewer physical restrictions and geographic limitations. For example, the number of educational institutions that a user can be enrolled in during a semester may be practically limitless, as there may be no requirement to physically attend each facility.

Learning materials (e.g. handouts, textbooks, etc.) may be provided in electronic formats so that they can be reproduced for a virtually unlimited number of users. In many cases, users participating in electronic learning may be presented a large number of learning materials in an electronic format. In these cases, it may be challenging for the learner to organize, sort, or search through a large number of materials to locate desired learning materials. This may be particularly challenging when users access electronic learning from more than one organization at a time.

SUMMARY

The various embodiments described herein generally relate to methods (and associated systems configured to implement the methods) for providing navigation of multiple organizations of one or more electronic learning systems.

An example method involves operating a processor to: obtain a global user identifier and obtain a navigation object to be displayed at the user computing device. The global user identifier represents a user at the user computing device. The global user identifier is linked to a plurality of organization identifiers. Each organization identifier represents an organization to which the user is enrolled. The navigation object includes a plurality of organization objects. Each of the organization objects corresponds to an organization identifier of the plurality of organization identifiers for navigating to an electronic learning system of the organization. The method also involves operating the processor to automatically generate an organization alert indicator for an organization object when the user has an outstanding alert from the electronic learning system of the organization.

In at least one embodiment, only one of the set of organization objects can be active within the navigation object at a time.

In at least one embodiment, the organization alert indicator can be visible when the organization object is inactive.

In at least one embodiment, the method can involve operating the processor to automatically clear the alert when the user navigates to an item corresponding to the alert of the organization object from the navigation object.

In at least one embodiment, the method can involve operating the processor to automatically clear the organization alert indicator when none of the alerts are outstanding.

In at least one embodiment, the method can involve operating the processor to poll the electronic learning system of the organization for outstanding alerts for the user.

In at least one embodiment, the electronic learning system of the organization can be polled at timed intervals.

In at least one embodiment, the method can involve operating the processor to generate a consolidated alert indicator when one or more organization alert indicators persist.

In at least one embodiment, the method can involve operating the processor to generate the navigation object to be displayed at the user computing device.

In at least one embodiment, the method can involve operating the processor to retrieve the navigation object to be displayed at the user computing device.

In at least one embodiment, the navigation object to be displayed at the user computing device can be based on a type of the user computing device.

In at least one embodiment, the navigation object can include a navigation tab or a mobile menu.

In at least one embodiment, the organization alert indicator can include at least one of a graphical object or a visual effect.

In at least one embodiment, the method can involve operating the processor to validate an authentication of the global user identifier prior to obtaining a navigation object to be displayed at the user computing device.

In at least one embodiment, the method can involve operating the processor to: receive a local user identifier from the user computing device; validate an authentication of the local user identifier; and locate the global user identifier linked to the local user identifier.

In at least one embodiment, the organization object corresponding to an organization identifier linked to the local user identifier can be initially active.

In at least one embodiment, the method can involve operating the processor to: determine whether only one of the plurality of organization identifiers linked to the global user identifier is an active enrollment; and in response to determining that only one of the plurality of organization identifiers linked to the global user identifier is an active enrollment, generate a single organization object instead of the navigation object to be displayed at the user computing device, the single organization object for navigating to the electronic learning system of the organization linked to the global user identifier having an active enrollment.

In at least one embodiment, obtaining a navigation object can involve: for each of the plurality of organization identifiers linked to the global user identifier, determine whether the link is an active enrollment; and for each link that is an active enrollment, including an organization object for navigating to the electronic learning system of the organization linked to the global user identifier having an active enrollment.

In another broad aspect, a system for providing navigation of multiple organizations of one or more electronic learning systems is disclosed herein. The system can include a communication component to provide access to one or more user computing devices; and a processor in communication with the communication component. The processor is operable to: obtain a global user identifier, and obtain a navigation object to be displayed at the user computing device. The global user identifier represents a user at a user computing device of the one or more user computing devices. The global user identifier is linked to a plurality of organization identifiers. Each organization identifier represents an organization to which the user is enrolled. The navigation object includes a plurality of organization objects. Each of the organization objects corresponds to an organization identifier of the plurality of organization identifiers for navigating to an electronic learning system of the organization. The processor is also operable to automatically generate an organization alert indicator for an organization object when the user has an outstanding alert from the electronic learning system of the organization.

In at least one embodiment, only one of the set of organization objects can be active within the navigation object at a time.

In at least one embodiment, the organization alert indicator can be visible when the organization object is inactive.

In at least one embodiment, the processor can be operable to automatically clear the alert when the user navigates to an item corresponding to the alert of the organization object from the navigation object.

In at least one embodiment, the processor can be operable to automatically clear the organization alert indicator when none of the alerts are outstanding.

In at least one embodiment, the processor can be operable to poll the electronic learning system of the organization for outstanding alerts for the user.

In at least one embodiment, the electronic learning system of the organization can be polled at timed intervals.

In at least one embodiment, the processor can be operable to generate a consolidated alert indicator when one or more organization alert indicators persist.

In at least one embodiment, the processor can be operable to generate the navigation object to be displayed at the user computing device.

In at least one embodiment, the processor can be operable to retrieve the navigation object to be displayed at the user computing device.

In at least one embodiment, the navigation object to be displayed at the user computing device can be based on a type of the user computing device.

In at least one embodiment, the navigation object can include a navigation tab or a mobile menu.

In at least one embodiment, the organization alert indicator can include at least one of a graphical object or a visual effect.

In at least one embodiment, the processor can be operable to validate an authentication of the global user identifier prior to obtaining a navigation object to be displayed at the user computing device.

In at least one embodiment, the processor can be operable to: receive a local user identifier from the user computing device; validate an authentication of the local user identifier; and locate the global user identifier linked to the local user identifier.

In at least one embodiment, the organization object corresponding to an organization identifier linked to the local user identifier can be initially active.

In at least one embodiment, the processor can be operable to: determine whether only one of the plurality of organization identifiers linked to the global user identifier is an active enrollment; and in response to determining that only one of the plurality of organization identifiers linked to the global user identifier is an active enrollment, generate a single organization object instead of the navigation object to be displayed at the user computing device, the single organization object for navigating to the electronic learning system of the organization linked to the global user identifier having an active enrollment.

In at least one embodiment, obtaining a navigation object can involve: for each of the plurality of organization identifiers linked to the global user identifier, determine whether the link is an active enrollment; and for each link that is an active enrollment, including an organization object for navigating to the electronic learning system of the organization linked to the global user identifier having an active enrollment.

BRIEF DESCRIPTION OF THE DRAWINGS

Several embodiments will now be described in detail with reference to the drawings, in which.

The drawings, described below, are provided for purposes of illustration, and not of limitation, of the aspects and features of various examples of embodiments described herein.

DESCRIPTION OF VARIOUS EMBODIMENTS

The various embodiments described herein generally relate to methods (and associated systems configured to implement the methods) for providing navigation of one or more electronic learning systems.

Users may access electronic learning systems to participate in, create, and consume electronic learning services, including educational content such as courses provided by an organization. In some cases, the organization may be part of (or associated with) a traditional "bricks and mortar" educational institution (e.g. a grade school, university or college), another entity that provides educational services (e.g. an online university, a company that specializes in offering training courses, an organization that has a training department, etc.), or may be an independent service provider (e.g. for providing individual electronic learning).

It should be understood that a course is not limited to formal courses offered by formal educational institutions. The course may include any form of learning instruction offered by an entity of any type. For example, the course may be a training seminar at a company for a group of employees or a professional certification program (e.g. Project Management Professional™ (PMP), Certified Management Accountants (CMA), etc.) with a number of intended participants.

In some examples, the electronic learning system can support multiple organizations. Organizations can maintain autonomy by each having a unique URL, login page, configuration variables, role permissions, tool usage needs, and branding. Users and content for each organization can be maintained entirely separate from each other.

Users may be associated with more than one organization. For example, users may be enrolled in course at different institutions, such as users that take a course from a first institution to earn credit towards their degree at a second institution. In another example, a user may be enrolled as a student in one course and as an instructor for another course. In another example, a user may be responsible for teaching several courses a different institutions. In another example, different organizations can have partnerships in which a business has a direct relationship with an educational institution so that employees of the business can earn credits or degrees to upskill.

Typically, each organization can appear entirely separate to users. As such, users associated with more than one organization may need to log into their account with each organization separately and manage course notifications within each separate login. However, this can be cumbersome and time-consuming. Once a user is signed into a first organization, they cannot access content from a second organization. The user would need to sign out of the electronic learning system with the first organization and sign into the electronic learning system with the second organization. Furthermore, the user is required to maintain logins for each organization that the user is associated with.

Figure 1:
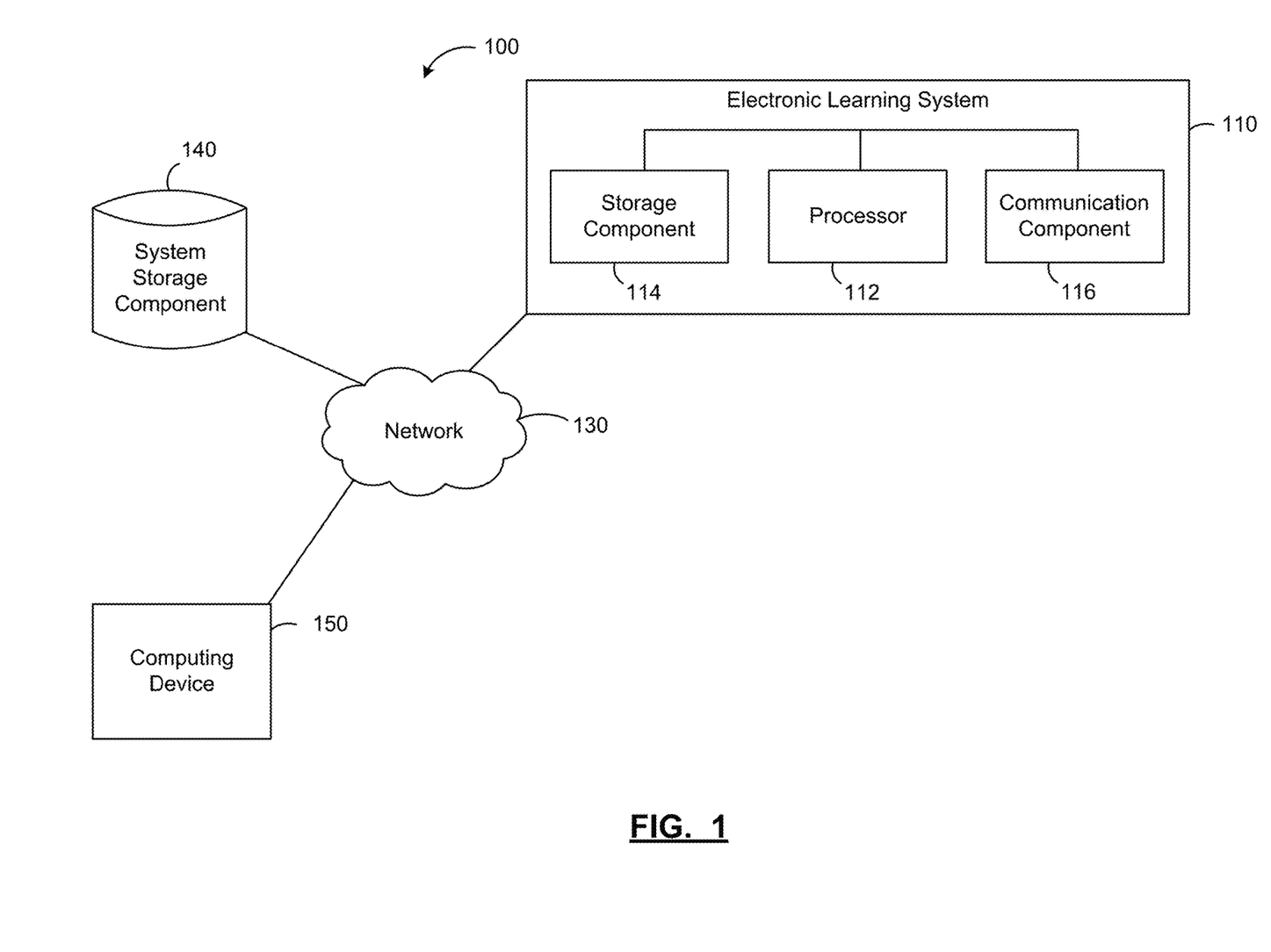
FIG. 1 is a block diagram of components interacting with an electronic learning system in accordance with some embodiments.

Reference is first made to FIG. 1, which illustrates an example block diagram 100 of an electronic learning system 110 in communication with a system storage component 140, and a computing device 150 via a network 130. Although only one computing device 150 is shown in FIG. 1, the electronic learning system 110 can be in communication with fewer or more computing devices 150. The electronic learning system 110 can communicate with the devices 150 over a wide geographic area via the network 130. The electronic learning system 110 can also communicate with additional electronic learning systems (not shown in FIG. 1).

As shown in FIG. 1, the electronic learning system 110 includes a processor 112, a storage component 114, and a communication component 116. The electronic learning system 110 may include one or more servers that may be distributed over a wide geographic area and connected via the network 130. In some embodiments, each of the processor 112, the storage component 114 and the communication component 116 may be combined into a fewer number of components or may be separated into further components.

The processor 112 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the electronic learning system 110. In some embodiments, the processor 112 can include more than one processor with each processor being configured to perform different dedicated tasks.

The processor 112 may be configured to control the operation of the electronic learning system 110. The processor 112 can include modules that initiate and manage the operations of the electronic learning system 110. The processor 112 may also determine, based on received data, stored data and/or user preferences, how the electronic learning system 110 may generally operate.

In some examples, the electronic learning system 110 may authenticate an identity of one or more of the users prior to granting the user access to the electronic learning system 110. For example, the electronic learning system 110 may require the users to provide identifying information (e.g., a login name and/or a password) in order to gain access to the electronic learning system 110.

In some examples, the electronic learning system 110 may allow certain users such as guest users, access to the electronic learning system 110 without requiring authentication information to be provided by those guest users. Such guest users may be provided with limited access, such as the ability to review one or more components of the course to decide whether they would like to participate in the course but without the ability to post comments or upload electronic files.

In some embodiments, the processor 112 can transmit data (e.g. electronic files such as web pages) over the network 130 to the computing devices 150. The data may include electronic files, such as webpages with course information, associated with the electronic learning system 110. Once the data is received at the computing devices 150, the computing devices 150 can operate to display the received data.

In some embodiments, the processor 112 can be separated into further components such as a an organization component, an alert component, a global user authentication component, and a global user mapping component, which can be combined into a fewer number of components or may be separated into further components. Each component may also be implemented with hardware or software, or a combination of both. For example, one or more components can include computer programs executable by the processor 112 to conduct the relevant operations.

For example, the organization component can provide unique URLs, login pages, and branding for different organizations. Furthermore, separate organization components can provide the URLs, login pages, and branding for each organization. Likewise, the alert component can provide alerts for users of different organizations. Separate alert components can provide alerts for each organization. Furthermore, separate alert components can provide alerts for different types of items that require alerts.

The global user authentication component can validate the authentication of a user, including the authentication based on a local user identifier or a global user identifier. Upon validation of user authentication, the global user authentication component can generate token data for that user authentication.

The global user mapping component can determine organizations that a user is enrolled in. That is, the global user mapping component can receive token data and obtain tenant data. Tenant data can relate to organizations that a user is enrolled in.

The electronic learning system 110 can include other components for providing the electronic learning services. For example, the electronic learning system 110 can include a user management component that allows users to maintain user account information and a course management component that allows users to add and/or drop courses.

The communication component 116 may be any interface that enables the electronic learning system 110 to communicate with other devices and systems. In some embodiments, the communication component 116 can include at least one of a serial port, a parallel port or a USB port. The communication component 116 may also include at least one of an Internet, Local Area Network (LAN), Ethernet, Firewire, modem, fiber, or digital subscriber line connection. Various combinations of these elements may be incorporated within the communication component 116.

For example, the communication component 116 may receive input from various input devices, such as a mouse, a keyboard, a touch screen, a thumbwheel, a track-pad, a track-ball, a card-reader, voice recognition software and the like depending on the requirements and implementation of the electronic learning system 110.

The communication component 116 can include additional communication components for providing the electronic learning services. For example, additional communication component can also enable communication between the users (e.g., a chat software, etc.). Additional communication components may also enable the electronic learning system 110 to benefit from tools provided by third-party vendors.

The storage component 114 can include RAM, ROM, one or more hard drives, one or more flash drives or some other suitable data storage elements such as disk drives, etc. The storage component 114 may include one or more databases (not shown), such as a relational database (e.g., a SQL database), for example. The storage component 114 is used to store an operating system and programs, for example. For instance, the operating system provides various basic operational processes for the processor. The programs include various user programs so that a user can interact with the processor to perform various functions such as, but not limited to, authenticating user information, delivering educational content, delivering assessments, maintaining assessment records, obtaining navigation objects, and generating alerts, as the case may be.

The storage component 114 can store various data associated with the operation of the electronic learning system 110. For example, course data, such as data related to a course's framework, educational content, and/or records of assessments, may be stored at the storage component 114. The storage component 114 may also store user data, which includes information associated with the users. The user data may include a user profile for each user, for example. The user profile may include personal information (e.g., name, gender, age, birthdate, contact information, interests, hobbies, etc.), authentication information to the electronic learning system 110 (e.g., login identifier and password) and educational information (e.g., previous courses that a user was enrolled in, in progress or upcoming courses that user is enrolled in, the user type, course content preferences, etc.). The login identifier can be a global user identifier and/or a local user identifier. A global user identifier can represent a user with multiple organizations. A local user identifier can represent a user with only one organization.

The storage component 114 can store a mapping for authentication information across multiple organizations. For example, a global user identifier can be associated with one or more organization identifiers and/or one or more local user identifiers. In some embodiments, the mapping includes pairs of token data and tenant data, in which a token can relate to a user and a tenant can relate to an organization.

The storage component 114 can store authorization criteria that define the actions that may be taken by certain users with respect to the various educational contents provided by the electronic learning system 110. The authorization criteria can define different security levels for different user types. For example, there can be a security level for an instructing user who is responsible for developing an educational course, teaching it, and assessing work product from the student users for that course. The security level for those instructing users, therefore, can include, at least, full editing permissions to associated course content and access to various components for evaluating the students in the relevant courses.

In some embodiments, some of the authorization criteria may be pre-defined. For example, the authorization criteria can be defined by administrators so that the authorization criteria are consistent for the electronic learning system 110, as a whole. In some further embodiments, the electronic learning system 110 may allow certain users, such as instructors, to vary the pre-defined authorization criteria for certain course contents.

Similar to the storage component 114, the system storage component 140 can store various data associated with the operation of the electronic learning system 110. Educational content and records of assessment can be stored in the system storage component 140 for retrieval by the computing device 150 or the electronic learning system 110.

The computing device 150 may be any networked device operable to connect to the network 130. A networked device is a device capable of communicating with other devices through a network such as the network 130. A network device may couple to the network 130 through a wired or wireless connection.

The computing device 150 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

In some embodiments, the computing device 150 may be a laptop, or a smartphone device equipped with a network adapter for connecting to the Internet. In some embodiments, the connection request initiated from the computing device 150 may be initiated from a web browser and directed at the browser-based communications application on the electronic learning system 110.

The network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the electronic learning system 110, the system storage component 140, and the computing device 150.

The electronic learning system 110 can also include one or more backup servers (not shown in FIG. 1). The backup server can store a duplicate of some or all of the data stored on the system storage component 140. The backup server may be desirable for disaster recovery (e.g. to prevent data loss in the event of an event such as a fire, flooding, or theft). The one or more backup servers can also be provided at the same geographical location as the electronic learning system 110, or one or more different geographical locations.

The systems and methods disclosed herein can enable users to associate separate user accounts across a plurality of organizations in one or more electronic learning systems. The term "linked organization" is used herein to denote an organization that is navigable from the user account of another organization.

For example, a user account such as Jon Smith (jsmith@firstorganization.edu) at a first organization may represent the same person as a user account for Jonathan Smith (john.smith@secondorganization.edu) at a second organization. By associating the separate user accounts across the two organizations, when the user logs into either one of the two organizations from the computing device 150, the user can also be logged into any other organizations.

Upon logging into an electronic learning system of an organization, a navigation object can be displayed on the computing device 150. The navigation object can be a primary user interface connection between organizations. The navigation object includes an organization object for each of the first organization and the second organization. Each organization object can include a link to a URL for the respective organization.

In some embodiments, the organization object can also display a notification to indicate that there are outstanding notifications for new activity in that particular organization. By providing indication of outstanding notifications, users can make informed decisions about where to focus their time. Users can remain up to date on their workload across multiple organizations when logging into just one organization. Upon selecting to view any one of the organization objects, the user can fully switch into that organization, changing both the site configuration (such as the appearance of the homepage) and their user configuration (such as their role and permissions) to the organization that they are viewing.

Figure 2:
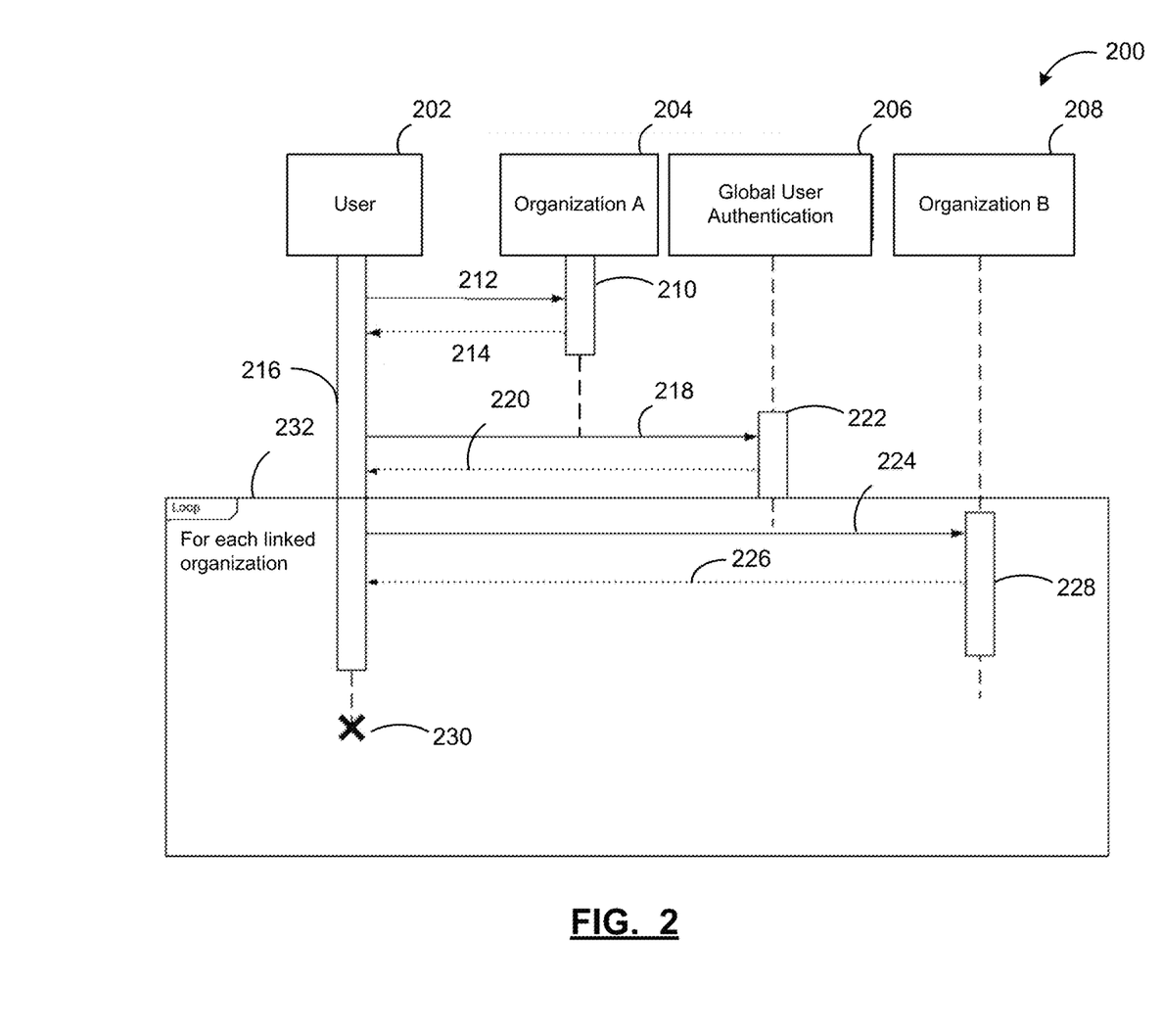
FIG. 2 is a schematic diagram of providing navigation of multiple organizations in one or more electronic learning systems in accordance with an example embodiment.

Referring now to FIG. 2, an example method of providing navigation of multiple organizations of one or more electronic learning systems is shown in a schematic diagram. To assist with the description of the method 200, reference will be made simultaneously to FIG. 1.

The method begins with a computing device 150 of a user 202. The computing device 150 can issue a request 212 to an electronic learning system, such as electronic learning system 110, of a first organization 204, such as "Organization A" of FIG. 2. The request 212 can involve providing token data, such as login data for a user. Login data can include a user identifier. The electronic learning system of the first organization 204 can authenticate 210 the login data. Authentication 210 can involve searching a database for valid login data. Authentication 210 can also involve verifying whether the login data relates to a user with an active enrollment at Organization A.

In response to the request 212, the electronic learning system of the first organization 204 can provide the computing device 150 with a link 214 for access to additional organizations. For example, the link 214 can be used to access a global user authentication component 206.

In addition, the electronic learning system of the first organization 204 can obtain any available alert information for user 202 and provide alert information to the computing device 150 of the user 202. The electronic learning system of the first organization 204 can cease providing alert information for user 202 at the computing device 150 when the user 202 logs out 230 of the electronic learning system of the first organization 204. In some embodiments, the alert information can have various actions associated therewith.

Using the received link 214 to the global user authentication component 206, the computing device 150 can issue a request 218 to the global user authentication component 206. In response to the request 218, global user authentication component 206 can validate 222 the authentication 210 of the first organization 204. Validation 222 can involve obtaining one or more pairs of tenant data and token data 220 and providing the pairs of tenant data and token data 220 to the computing device 150 of the user 202. Pairs of tenant data and token data 220 can include user identifiers for the user 202 at different organizations.

Using the one or more pairs of tenant data and token data 220, the computing device 150 can issue additional requests 232 to electronic learning systems of each additional organization. For example, the computing device 150 can issue a request 224 to an electronic learning system of a second organization 208, such as "Organization B" of FIG. 2. The second electronic learning system of the second organization 208 can be provided by the same electronic learning system 110 as the first organization 204 or a different electronic learning system 110.

In response to the request 224, the electronic learning system of the second organization 208 can authenticate 228 the token data received in the request 224. Authentication 228 can involve searching a database for valid token data. Authentication 228 can also involve verifying whether the token data relates to a user with an active enrollment at Organization B.

In addition, the electronic learning system of the second organization 208 can obtain any available alert information for user 202 and provide alert information to the computing device 150 of the user 202. The electronic learning system of the second organization 208 can cease providing alert information for user 202 at the computing device 150 when the user 202 logs out 230 of the electronic learning system of the first organization 204. In some embodiments, the alert information can have various actions associated therewith.

While only two organizations 204, 208 are shown in FIG. 2, navigation to any number of organizations can be provided. Furthermore, while the electronic learning systems of the first organization 204 and the second organization 208 are shown in FIG. 2 as separate components, in some embodiments, they can be provided by the same electronic learning system, such as electronic learning system 110 of FIG. 1.

As well, while the global user authentication component 206 is shown as a separate component from the electronic learning systems of the first organization 204 and the second organization 208, in some embodiments, it can be combined with the electronic learning system of the first organization 204 and/or the second organization 208.

Figure 3:
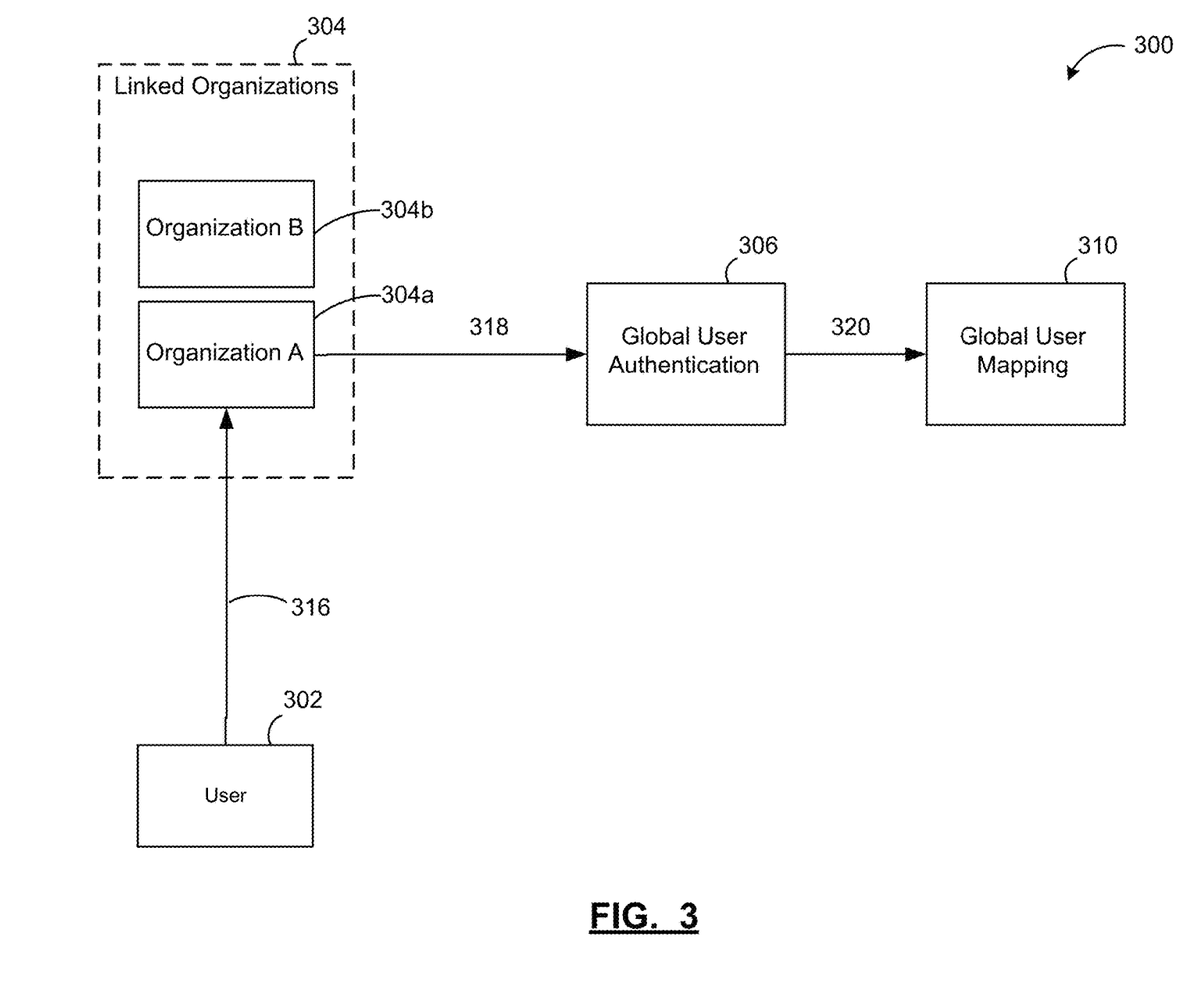
FIG. 3 is a schematic diagram of accessing multiple organizations in one or more electronic learning systems in accordance with an example embodiment.

Referring now to FIG. 3, an example method 300 of accessing multiple organizations of one or more electronic learning systems is shown in a schematic diagram.

In particular, method 300 illustrates how the global user authentication component 206 obtains 222 one or more pairs of tenant data and token data 220.

A user 302 issues a request 316 to the electronic learning system 110. In this example, the request 316 can include a local user identifier for a first organization 304a, shown in "Organization A" in FIG. 3. As can be seen, the first organization 304a can be a part of a group of linked organizations 304. As shown in FIG. 3, the group of linked organizations 304 can also include a second organization 304b. While only two organizations 304a, 304b are shown in the group of linked organizations 304, the group of linked organizations 304 can include any number of organizations.

The electronic learning system of Organization A, such as electronic learning system 110 of FIG. 1, can authenticate the local user identifier received in the request 316. The electronic learning system of Organization A can generate a request 318. Request 318 can be made to the global user authentication component 306 using the local user identifier to obtain token data. That is, a request 318 can be made to the global user authentication component 306 to obtain a global user identifier.

The global user authentication component 306 can receive the request 318. The global user authentication component 306 can validate the authentication of the local user identifier. The global user authentication component 306 can determine the global user identifier corresponding to the local user identifier. That is, the global user authentication component 306 can obtain token data. The global user authentication component 306 can generate a request 320. Request 320 can be made to the global user mapping service 310 using the token data to obtain tenant data.

The global user mapping component 310 can receive the request 320. The global user mapping component 310 can determine organization identifiers associated with the global user identifier. That is, the global user mapping component 310 can obtain tenant data for the token data. The global user mapping component 310 can generate pairs of tenant and token data to be provided to the computing device 150.

As a result, the user 302 can use their local user identifier to obtain access to their account at each organization of the group of linked organizations 304. For each of their accounts at a linked organization, the method 300 involves requesting 318 token data. In turn, the token data can be used to request 320 tenant data.

While only two organizations 304a, 304b are shown in FIG. 3, access to any number of organizations can be provided. Furthermore, while the electronic learning systems of the first organization 304a and the second organization 304b are shown in FIG. 3 as separate components, in some embodiments, they can be provided by the same electronic learning system, such as electronic learning system 110 of FIG. 1.

While the global user authentication component 306 and the global user mapping component 310 are shown in FIG. 3 as separate components, in some embodiments, the global user authentication component 306 and the global user mapping component 310 can be the same component. As well, while the global user authentication component 306 and the global user mapping component 310 are shown as separate components from the electronic learning systems of the linked organizations 304, in some embodiments, the global user authentication component 306 and the global user mapping component 310 can be combined with the electronic learning system of any one or more organizations 304.

Figure 4:
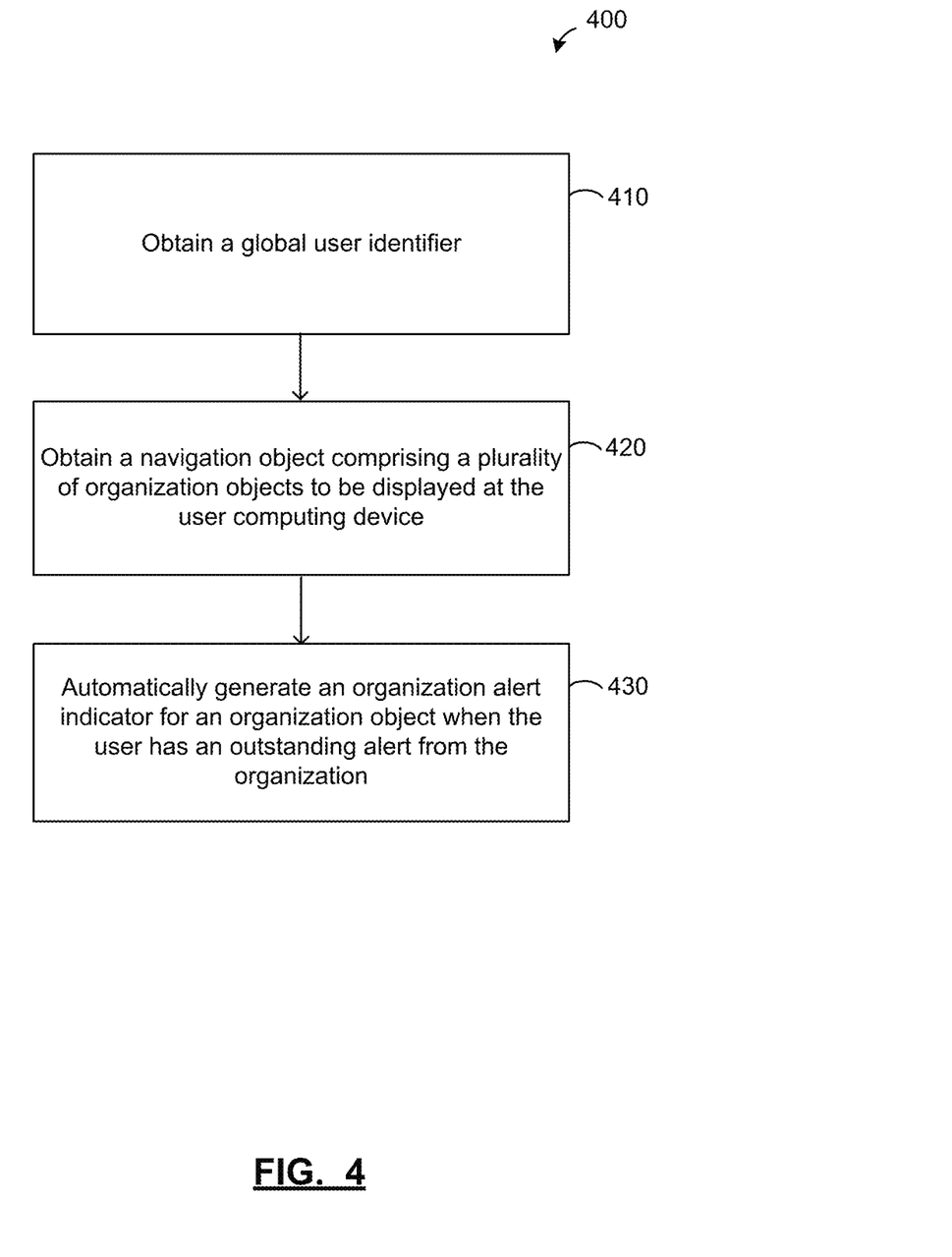
FIG. 4 is a flowchart diagram of an example method for providing navigation of multiple organizations in one or more electronic learning systems in accordance with an example embodiment.

Referring now to FIG. 4, an example method 400 of providing navigation of multiple organization in one or more electronic learning systems is shown in a flowchart diagram. To assist with the description of the method 400, reference will be made simultaneously to FIG. 1.

At 410, the processor 112 obtains a global user identifier. The global user identifier is stored in the storage component 114. The global user identifier represents the user at the user computing device 150. The global user identifier is linked to a plurality of organization identifiers stored in the storage component 114. Each organization identifier represents an organization to which the user is enrolled.

In some embodiments, the processor 112 can receive the global user identifier and validate the authentication of the global user identifier obtained at 410. Authentication can involve retrieving authentication information from the storage component 114.

In some embodiments, the processor 112 can receive a local user identifier from the user computing device 150 and validate the authentication of the local user identifier. Having authenticated the local user identifier, the processor 112 can locate the global user identifier linked to the local user identifier. The storage component 114 can store a mapping of the global user identifier with one or more local user identifiers. The processor 112 can retrieve the global user identifier from the mapping stored in storage component 114.

In some embodiments, the processor 112 can enforce additional authentication criteria. For example, the processor 112 can only log the user into the electronic learning system of the organization if the enrollment is active. An enrollment can be considered active when the user is taking or teaching a course at the organization. An enrollment can be considered inactive when the user previously took a course at the organization but is not currently taking or teaching a course. In the event that the user is only actively enrolled in one organization, the processor 112 may not provide the navigation object.

For example, the processor 112 can determine whether only one of the plurality of organization identifiers linked to the global user identifier is an active enrollment. In response to determining that only one of the plurality of organization identifiers linked to the global user identifier is an active enrollment, the processor 112 can generate a single organization object instead of the navigation object to be displayed at the user computing device. The single organization object can allow for navigating the organization within the electronic learning system.

At 420, the processor 112 generates a navigation object to be displayed at the user computing device 150. The navigation object includes a plurality of organization objects.

Each of the organization objects correspond to an organization identifier of the plurality of organization identifiers. The organization object displayed at the user computing device 150 allows the user to navigating to the electronic learning system of the organization.

In some embodiments, the processor 112 can obtain a navigation object to be displayed at the user computing device 150 after validating the authentication of the global user identifier.

The processor 112 can obtain a navigation object to be displayed at the user computing device 150. In some embodiments, the processor 112 can generate the navigation object to be displayed at the user computing device 150. In some embodiments, the processor 112 can retrieve the navigation object to be displayed at the user computing device 150. In some embodiments, the navigation object can be based on a type of the user computing device 150. For example, when the user computing device 150 is a personal computer, the processor 112 can generate a navigation tab as the navigation object. In some embodiments, the navigation tab can be scrollable. A scrollable navigation tab can be used when display screen space is limited and the navigation object includes a large number of organization objects. In another example, when the user computing device 150 is a mobile device, the processor 112 can obtain a mobile menu as the navigation object. The mobile menu can use less display screen space than navigation tabs.

In some embodiments, the processor 112 can include an organization object in the navigation object for each electronic learning system of an organization that the user has an active enrollment in. That is, the processor 112 can omit organizations from the navigation object if the user is not actively enrolled at that organization. Omitting organizations for which the user is not actively enrolled can reduce clutter on the user interface, thereby enhancing the user experience.

In some embodiments, the user can configure the navigation object. For example, the user can configure the navigation object to omit an organization object that is not valuable, despite having an active enrollment at that organization.

An organization object can be active when the user is viewing the organization object. That is, when the user is viewing that organization in the electronic learning system. In some embodiments, only one of the set of organization objects is active within the navigation object at a time. It should be noted that a navigation object, such as a navigation tab or a mobile menu, can be displayed within a single browser. However, the user computing device 150 can operate multiple browsers at a time. As a result, a plurality of organization objects can be active across a plurality browsers of the user computing device 150 at a time.

In the event that the processor 112 determines that the user is actively enrolled in a plurality of organizations, the processor 112 can select the organization for which a local user identifier was received at 410 as being initially active in some embodiments. That is, the organization object can be the organization that the user logged in through. Other configurations are possible. In some embodiments, the organization object to which the user is primarily enrolled in (i.e., obtaining a degree from as opposed to taking a single course) can be initially active.

In some embodiments, the processor 112 can poll the electronic learning system of the organization for outstanding alerts for the user. The organization can be polled at timed intervals, on an ad hoc basis, or continually polled. Polling continuously can provide instantaneous notification but increase system processing, thereby reducing performance of the system. Polling at time intervals can provide sufficient notification without affecting system performance.

In some embodiments, logging into the electronic learning system of the first organization also logs the user into additional organizations. In such cases, the user can view the organization by selecting the organization object without providing additional login information.

In some embodiments, the user may be required to provide login information for an organization upon selecting that organization object in order to view the electronic learning system of the organization. That is, logging into an electronic learning system of a first organization may not log the user into electronic learning systems of additional organizations.

At 430, the processor 112 automatically generates an organization alert indicator for an organization object when the user has an outstanding alert from the organization. Alerts from the organization can relate to new activity in the organization such as, but not limited to, opening of course registrations, new learning materials, new messages, new assessment records being made available.

In some embodiments, the organization alert indicator can be visible when the organization object is inactive. The organization alert indicator can be a graphical object and/or a visual effect. A graphical object can be, but is not limited to, the notification dot. A visual effect can be, but is not limited to, blinking of the notification dot, blinking of the tab, or the tab text, a change of the tab color, or a change of color of the tab text.

In some embodiments, the processor 112 can generate a consolidated alert indicator when one or more organization alert indicators persist. Similar to the organization alert indicator, the consolidated alert indicator can be a graphical object and/or a visual effect. A consolidated alert indicator can be used, for example, with a mobile menu. The consolidated alert indicator can appear on a condensed mobile menu while organization alert indicators can appear on the expanded mobile menu.

In some embodiments, the processor 112 can automatically clear the alert when the user navigates to an item corresponding to the alert of the organization object from the navigation object. For example, the processor 112 can clear an alert after a user has reviewed new course material.

In some embodiments, the processor 112 can automatically clear the organization alert indicator when none of the alerts within the organization are outstanding. The processor 112 can poll the electronic learning system of the organization. If no alerts are available, the processor 112 can clear the organization alert indicator from the organization object. If the organization alert indicator is a graphical object, the graphical object can be removed. If the organization alert indicator is a visual effect, the visual effect can be discontinued. If any alerts remain, the processor 112 can retain the organization alert indicator on the organization object.

Figure 5A:
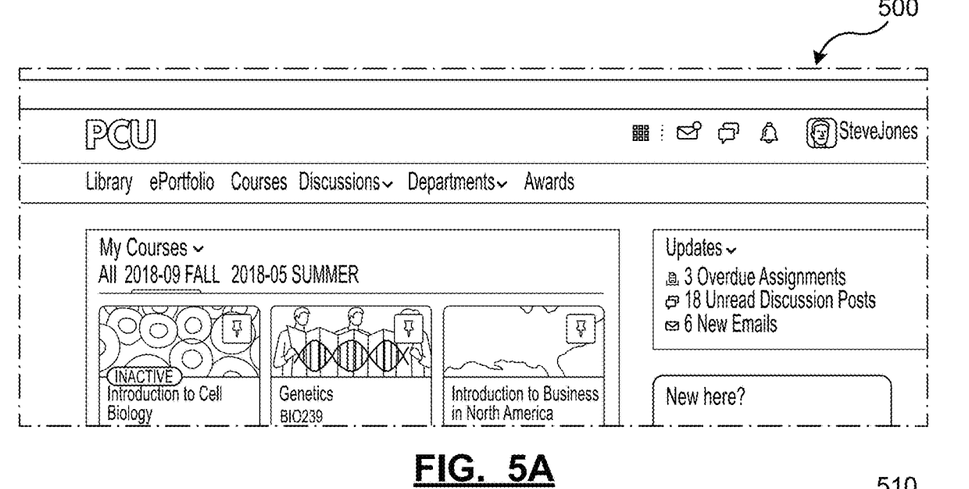
FIG. 5A is screenshot of an example user interface for a single organization in an electronic learning system.
Figure 5B:
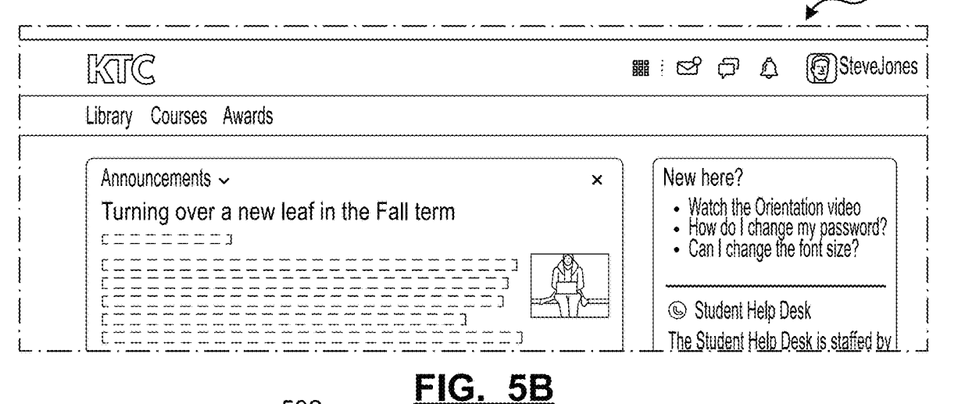
FIG. 5B is screenshot of another example user interface for a single organization in an electronic learning system.

Referring now to FIG. 5A and FIG. 5B, screenshots 500 and 510 of example user interfaces for single organizations in an electronic learning system are shown. As shown in FIG. 5A and FIG. 5B, the screenshots 500 and 510 show user interfaces on a desktop computer.

Figure 5C:
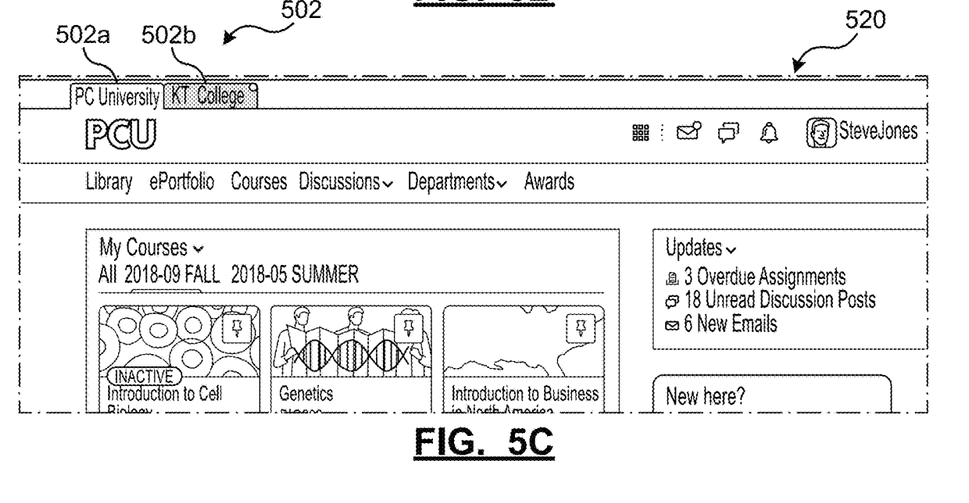
FIG. 5C is screenshot of an example user interface for navigating multiple organization of one or more electronic learning systems.

Referring now to FIG. 5C, a screenshot 520 of an example user interface for navigating multiple organizations of one or more electronic learning systems is shown. As shown in FIG. 5C, the screenshot 520 shows a user interface on a desktop computer.

The user interface on a desktop computer includes navigation object 502, which in this example are navigation tabs 502*a*, 502*b*. As shown, navigation tab 502*a* corresponds to the organization of screenshot 500 of FIG. 5A and navigation tab 502*b* corresponds to the organization of screenshot 520 of FIG. 5B. That is, each navigation tab 502*a*, 502*b* is an organization object. Although only two tabs are shown, fewer or more tabs can be included.

In this example screenshot 500, tab 502*a* is active while tab 502*b* is inactive. That is, the user is viewing tab 502*a* and not viewing tab 502*b*. Active and inactive tabs 502*a*, 502*b* are indicated with color coding. For example, tab 502*a* is indicated as being active with a white foreground while tab 502*b* is indicated as being active with a shaded foreground.

Figure 6:
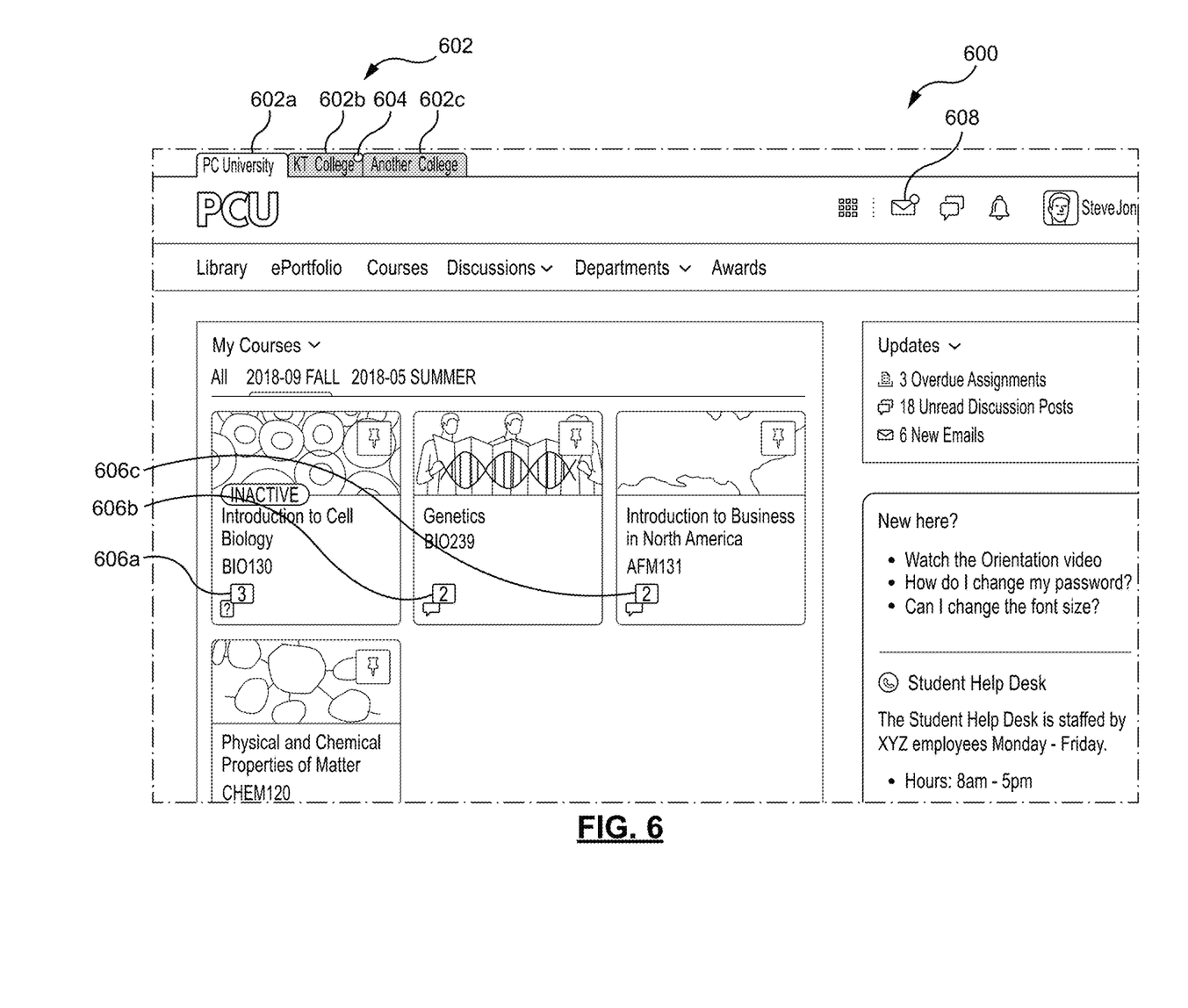
FIG. 6 is screenshot of another example user interface for navigating multiple organizations of one or more electronic learning systems.

Referring now to FIG. 6, a screenshot of another example user interface for navigating multiple organizations of one or more electronic learning systems is shown. As shown in FIG. 6, the screenshot 600 shows a user interface on a desktop computer.

The user interface on a desktop computer includes navigation object 602, which in this example are navigation tabs 602*a*, 602*b*, 602*c*. As shown, each navigation tab 602*a*, 602*b*, 602*c* corresponds to a different organization. Although only three tabs are shown, fewer or more tabs can be included. For example, the user may have active enrollments in all three organizations of tabs 602*a*, 602*b*, 602*c*. The user may have an inactive enrollment at a fourth organization, for which a tab is not provided.

In this example screenshot 600, tab 602*a* is active while tabs 602*b*, 602*c* are inactive. Similar to screenshot 500, active and inactive tabs 602*a*, 602*b*, 602*c* are indicated with color coding in screenshot 600. For example, tab 602*a* is indicated as being active with a white foreground while tabs 602*b*, 602*c* are indicated as being active with a shaded foreground.

An alert 604 is provided on the inactive tab 602*b* in the form of a notification dot. The alert 604 can relate to any new item that the user has not reviewed. For example, on the active tab 602*a*, the user has not reviewed new comments 606*a*, 606*b* and new emails 608.

Figure 7:
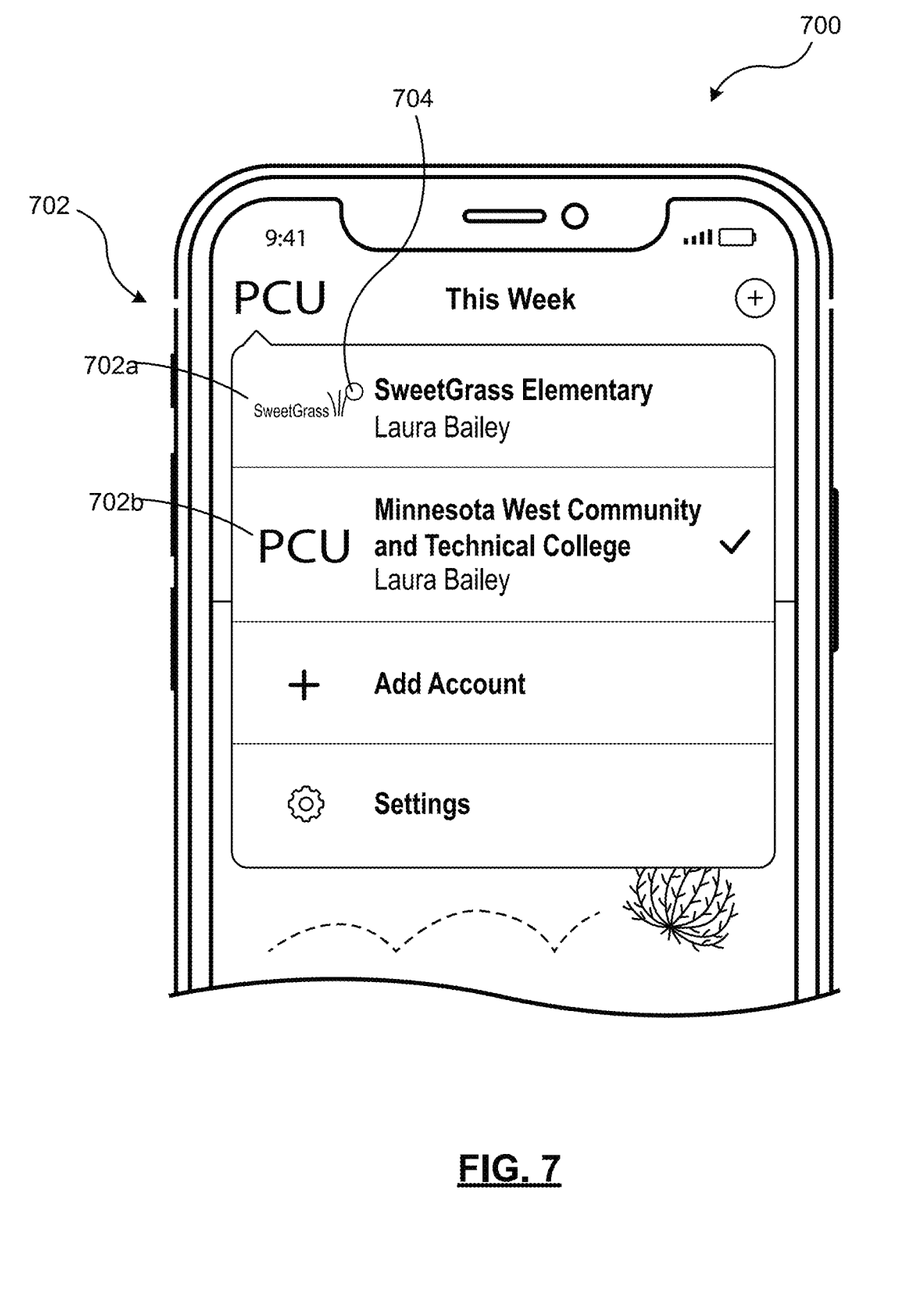
FIG. 7 is screenshot of another example user interface for navigating multiple organizations of one or more electronic learning systems.

Referring now to FIG. 7, a screenshot of another example user interface for navigating multiple organizations of one or more electronic learning systems is shown. As shown in FIG. 7, the screenshot 700 shows a user interface on a mobile device.

The user interface on a mobile device includes navigation object 702, which in this example are mobile menus 702*a*, 702*b*. As shown, mobile menu 702*a*, 702*b* corresponds to a different organization. Although only two menus are shown, fewer or more menus can be included.

In this example screenshot 700, menu 702*b* is active while menu 702*a* is inactive. Similar to screenshots 500 and 600, active and inactive menus 702*a*, 702*b* are indicated with color coding in screenshot 700. However, in screenshot 700, menu 702*a* is indicated as being inactive with a white foreground while menu 702*b* is indicated as being active with a shaded foreground. An alert 704 is provided on the inactive menu 702*a* in the form of a notification dot.

Figure 8:
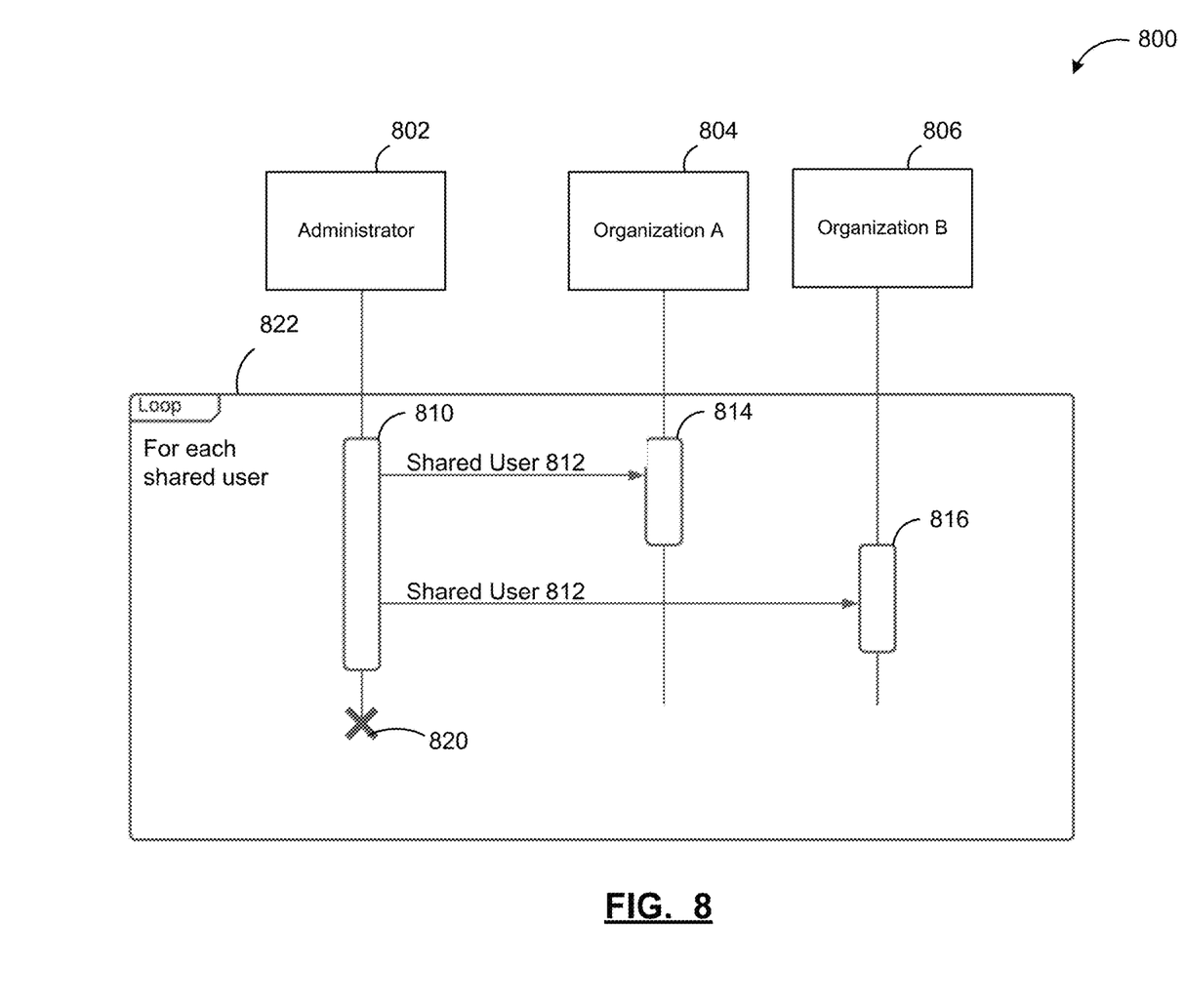
FIG. 8 is a schematic diagram of an example method for assigning global user identifiers to multiple organizations in one or more electronic learning systems in accordance with an example embodiment.

Referring now to FIG. 8, an example method of assigning global user identifiers to multiple organizations in one or more electronic learning systems is shown in a schematic diagram. To assist with the description of the method 800, reference will be made simultaneously to FIG. 1.

The method begins with a computing device 150 of an administrator 802. The computing device 150 of the administrator 802 can generate 810 a global user identifier that is unique for each user across one or more electronic learning systems of all organizations.

The administrator 802 can assign 814 the global user identifier generated to a shared user of an organization, such as "Shared user" 812 of "Organization A" 802. In some embodiments, assigning 814 the global user identifier to a shared user of an organization 812 can involve linking the global user identifier to a local user identifier for representing the shared user at the organization 812.

In some embodiments, a subset of users of an organization may be considered a shared user and assigned a global user identifier. For example, a user may be considered a shared user because they are associated with at least a second organization, such as "Organization B" 806. That is, a shared user can be a user that is associated with two or more organizations. In some embodiments, all users of an organization may be considered a shared user and assigned a global user identifier, even if a user is not associated with a second organization. In such cases, the organization may use global user identifiers as local user identifiers for representing users at the organization.

The administrator 802 can also assign 816 the global user identifier generated at 810 to the shared user 812 at the second organization, "Organization B" 806. Furthermore, the administrator 802 can assign 820 the global user identifier to the user at each organization that the user is associated with. In some embodiments, assigning 814, 816, 820 the global user identifier to a user in an electronic learning system of an organization can involve calling an application programming interface (API).

In some embodiments, the electronic learning systems of the organizations, such as Organization A 804 and Organization B 806, can require the administrator 802 to have appropriate permission privileges to manage user accounts, such as assigning 814, 816 a global user identifier to a user 812.

The administrator 802 can reiterate 822 this process to assign a global user identifier for each shared user 812. That is, for each user, the administrator 802 can generate a global user identifier for that user and assign the global user identifier to that user at each organization that the user is associated with.

Method 800 is shown for illustrative purposes and other embodiments are possible. For example, while only two organizations 804, 806 are shown in FIG. 8, the assignment of global user identifiers to any number of organizations can be provided. Furthermore, while the electronic learning systems of the first organization 804 and the second organization 806 are shown in FIG. 8 as separate components, in some embodiments, they can be provided by the same electronic learning system, such as electronic learning system 110 of FIG. 1.

For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments. Also, in the various user interfaces illustrated in the drawings, it will be understood that the illustrated user interface text and controls are provided as examples only and are not meant to be limiting. Other suitable user interface elements may be possible.

We claim:

1. A computer-implemented method for providing navigation of multiple organizations of one or more electronic learning systems, the method comprising operating a processor to:
    receive a local user identifier from the user computing device;
    validate an authentication of the local user identifier;
    obtain a global user identifier linked to the local user identifier, the global user identifier representing a user at the user computing device, the global user identifier being linked to a plurality of organization identifiers, each organization identifier representing an organization to which the user is enrolled;
    obtain a navigation object to be displayed at the user computing device, the navigation object comprising a plurality of organization objects, each of the organization objects corresponding to an organization identifier of the plurality of organization identifiers for navigating to an electronic learning system of the organization; and
    automatically generate an organization alert indicator for an organization object when the user has an outstanding alert from the electronic learning system of the organization, the organization alert indicator displayed at the navigation object.

2. The method of claim 1, wherein only one of the set of organization objects is active within the navigation object at a time.

3. The method of claim 1, wherein the organization alert indicator is visible when the organization object is inactive.

4. The method of claim 1 comprises operating the processor to automatically clear the alert when the user navigates to an item corresponding to the alert of the organization object from the navigation object.

5. The method of claim 1 comprises operating the processor to automatically clear the organization alert indicator when none of the alerts are outstanding.

6. The method of claim 1 comprises operating the processor to poll the electronic learning system of the organization for outstanding alerts for the user.

7. The method of claim 1 comprises operating the processor to generate a consolidated alert indicator when one or more organization alert indicators persist.

8. The method of claim 1 comprises operating the processor to validate an authentication of the global user identifier prior to obtaining a navigation object to be displayed at the user computing device.

9. The method of claim 1, wherein obtaining a navigation object comprises:
    for each of the plurality of organization identifiers linked to the global user identifier, determine whether the link is an active enrollment; and for each link that is an active enrollment, including an organization object for navigating to the electronic learning system of the organization linked to the global user identifier having an active enrollment.

10. The method of claim 1, wherein the electronic learning system of the organization is polled at timed intervals.

11. The method of claim 1 comprises operating the processor to retrieve the navigation object to be displayed at the user computing device.

12. The method of claim 1, wherein the navigation object to be displayed at the user computing device is based on a type of the user computing device.

13. The method of claim 1, wherein the navigation object comprises a navigation tab.

14. The method of claim 1, wherein the navigation object comprises a mobile menu.

15. The method of claim 1, wherein the organization alert indicator comprises at least one graphical object.

16. The method of claim 1, wherein the organization alert indicator comprises at least one visual effect.

17. The method of claim 1, wherein the organization object corresponding to an organization identifier linked to the local user identifier is initially active.

18. The method of claim 1 comprises operating the processor to:
   determine whether only one of the plurality of organization identifiers linked to the global user identifier is an active enrollment; and
   in response to determining that only one of the plurality of organization identifiers linked to the global user identifier is an active enrollment, generate a single organization object instead of the navigation object to be displayed at the user computing device, the single organization object for navigating to the electronic learning system of the organization linked to the global user identifier having an active enrollment.

* * * * *